(12) United States Patent
Ouyang

(10) Patent No.: US 8,058,618 B2
(45) Date of Patent: Nov. 15, 2011

(54) HIGH SENSITIVITY THZ SIGNAL DETECTOR AND CAMERA

(75) Inventor: Zhengbiao Ouyang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 894 days.

(21) Appl. No.: 11/964,027

(22) Filed: Dec. 25, 2007

(65) Prior Publication Data

US 2010/0282967 A1  Nov. 11, 2010

(30) Foreign Application Priority Data

Dec. 25, 2006  (CN) .......................... 2006 1 0157849

(51) Int. Cl.
   *G02B 6/10*  (2006.01)
   *G01J 5/02*  (2006.01)
(52) U.S. Cl. .................. 250/341.1; 250/341.8; 250/332; 385/129
(58) Field of Classification Search ............... 250/341.1, 250/341.8, 332; 385/122, 129
   See application file for complete search history.

(56) References Cited

U.S. PATENT DOCUMENTS

2004/0075464 A1* 4/2004 Samuelson et al. ............. 326/37
2004/0175087 A1* 9/2004 Soljacic et al. ............... 385/129
* cited by examiner

*Primary Examiner* — David Porta
*Assistant Examiner* — Jessica L Eley
(74) *Attorney, Agent, or Firm* — Matthias Scholl P.C.; Matthias Scholl

(57) ABSTRACT

Taught is a high sensitivity THz detector and camera comprising an integration body of a photonic crystal THz microcavity and semiconductor transistor on a semiconductor base. The THz signal is localized inside of the photonic crystal micro-cavity so as to generate high intensity field in the micro-cavity. The heat effect of the THz wave therein produces electron-hole pairs in the semiconductor. The current carrier is injected into the base electrode of the transistor and is amplified therein to produce signal current in the external circuit and thus high sensitive THz signal detection is realized. Integrating many such detectors together to construct a THz resonant cavity array, each resonant cavity only receives THz light from a certain position and having certain intensity. The signal is converted and then stored to obtain a complete THz image so as to realize imaging in real-time. Special signal amplification circuit is used to eliminate THz background radiation noise.

17 Claims, 3 Drawing Sheets

HIGH SENSITIVITY THZ SIGNAL DETECTOR AND CAMERA

CROSS-REFERENCE TO RELATED APPLICATIONS

This application claims priority to Chinese Patent Application No. 200610157849.5 filed Dec. 25, 2006, the contents of which are incorporated herein by reference.

BACKGROUND OF THE INVENTION

1. Field of the Invention

The invention relates to signal detectors and cameras having high sensitivity in the THz range, and more particularly, to high sensitivity THz signal detectors and cameras employing photonic crystal technology.

2. Description of the Related Art

The term "THz wave" refers to electromagnetic radiation with frequency in the range of 100 GHz-10 THz (which corresponds to a wavelength of 30 μm-3 mm). This frequency is located between microwave frequency and infrared frequency. Due to the absence of effective THz wave generation and detection methods, the knowledge about the performance of THz band electromagnetic radiation is limited. This gave rise to a "THz gap" in the electromagnetic spectrum.

With the rapid development of ultra-fast laser technology over the past several years, a stable and reliable way for generating THz pulse is provided. Thus, the study on THz wave radiation mechanism is promoted and the relevant detection and application technology flourish.

Compared with conventional light sources, the THz pulse light source has the following properties:

a) the THz wave has a pulse width of about 0.1-10 ps magnitude, which can be used not only for transient spectrum study with a subpicosecond time resolution, but also to avoid effectively the disturbance of background radiation noise with the assistance of sampling gate measurement technology. Currently, the signal to noise ratio for measuring THz wave radiation strength is greater than $10^4$ level;

b) the THz pulse source usually comprises electromagnetic oscillation having more than one period; the bandwidth of a single pulse can cover the range of GHz to scores of THz;

c) the THz wave having a very high time and space coherence can be used as a camera light source, so that the amplitude and phase can be obtained at the same time; and d) the THz wave has a photon energy only in the millielectronvolt range, so that the THz wave will not destroy a tested object, and thus can be used for non-destructive testing.

As a novel ultra-infrared coherent source, the THz wave is mainly applied in two technologies, namely, the THz wave time-domain spectrum analysis technology and the THz wave imaging technology. Potentially, it can also be applied for time resolution THz spectrum measurement for various solids, especially semiconductors, THz wave medical imaging, THz wave time-domain spectrum analysis of biological molecular conformation, null DNA molecule detection, THz wave micro-imaging, and so on.

The THz wave scanning delay system in conventional THz spectrum and imaging technology mainly adopts point-by-point mechanical scanning or electric translation scanning to realize time-delayed time domain spectrum measurement and imaging with the help of computer composition. This method has drawbacks such that an upper limit for scanning exists, the scanning speed is insufficient, the spectrum information cannot be observed timely, the time-space resolution is poor, and thus a real-time imaging is difficult to realize. Besides, the hot background noise, resulting from the slow scanning speed, cannot be suppressed effectively, which limits the practical application of the THz imaging technology. For example, for inspection at customs or safety checks at other confidential places, the image signal needs to be obtained immediately, leading to the requirement for developing practical THz detector and camera.

On the other hand, most current THz detection and imaging technologies are realized by means of electro-optical modulating cell, which also obstructs the integration of THz detector and camera.

Chinese Pat. Appl. No. CN 03116029.8 entitled "THz wave two-dimensional electro-optic area array imaging method" introduces a two-dimensional area array electro-optic crystal THz signal detector. Though the time-space resolution and signal-noise ratio are good and instant imaging can be realized, the detection sensitivity is not satisfactory and the capability to detect low power THz signal is poor.

SUMMARY OF THE INVENTION

Therefore, it is one objective of this invention to provide a high sensitivity THz signal detector and camera employing photonic crystal micro-cavities, and methods for manufacturing and using thereof.

The method for manufacturing a high sensitivity THz signal detector and camera comprises: (a) preparing a photonic crystal having a lattice constant in the range of THz wavelength magnitude by using a semiconductor or metal material; and (b) changing the dimension of one of the dielectric or metal rods to form a defect to form a photonic crystal THz micro-cavity. A frequency in the THz range can be obtained according to demand by adjusting the lattice constant and the size of the defect.

The high sensitivity THz signal detector receives and localizes THz signal via a single photonic crystal THz micro-cavity, which also syntonizes and amplifies the THz signal. The semiconductor unit below the micro-cavity functions to generate electron-hole pairs by a thermo-effect due to the high intensity field inside of the micro-cavity. A signal current is generated in the external circuit by injecting current carriers into the base electrode of the transistor, and is proportional to the THz wave intensity so that the THz wave signal can be detected.

For rapid photographing and real-time viewing, many such photonic crystal THz micro-cavities are integrated into an area to from an array of THz resonant cavities, being equivalent to a high sensitivity THz signal detector area array. Irradiated by THz wave, each resonant cavity receives a THz light from a specific position and having a specific intensity, a THz signal relevant to the THz radiation intensity of the specific position exists inside of each cavity, and the signal is localized in the cavity and is amplified proportionally, so that the sensitivity to THz light is greatly improved.

Allocating the same quantities of Si (optionally, GaAs or other semiconductor) units and transistors (or diodes) below the photonic crystal THz micro-cavity area array, these units will release electron-hole pairs under the function of THz wave and thus generate signal currents. The signal currents are collected by a signal acquisition circuit where electronic switches are used; and the acquired signal is then inputted into an A/D converter. The signal is finally stored in a random access memory (RAM) to obtain a complete THz image. The time used for acquiring a THz image is the same as that used for imaging by a normal digital camera, so that imaging with a higher speed can be obtained.

Another problem for imaging with THz wave is that much of the THz background radiation noise in a natural environment with a normal temperature is difficult to eliminate. A conventional way to overcome the influence of the background noise is to apply the detector in a super-low temperature environment, resulting in a large size of the detection device and thus relatively high cost. A special signal extraction circuit is adopted in the embodiments of this invention; the noise signal caused by the THz background radiation can be eliminated by adjusting the bias voltage of the regulating circuit.

As a result, the high sensitivity THz signal detector and camera of this invention provides many advantages. The two dimensional THz wave signal can be detected directly in an instant and thus the two dimensional THz wave imaging occurs in real time. The major material used for manufacturing of the units is Si semiconductor material so that it can be integrated with other electronic components directly. In addition, this invention provides very high sensitivity, good time and space resolution, high signal-noise ratio, and good capability for integration.

Figure 1:
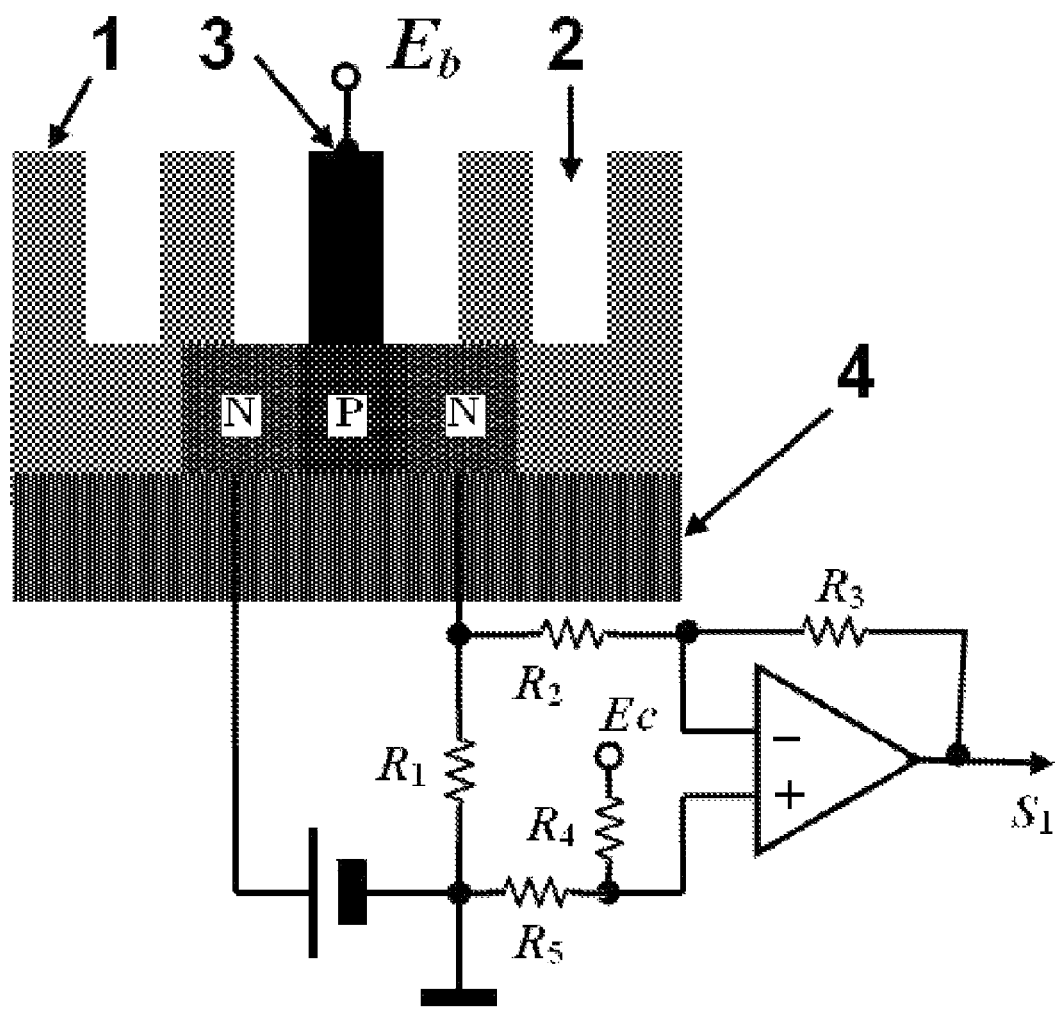
FIG. 1 is a side view of a high sensitivity THz signal detector or a unit of a THz camera system according to one embodiment of this invention.

The reference numbers of the various parts shown in the drawings are listed below, in which semiconductor Si or GaAs material corresponds to the number 1 (the semiconductor poles and the defect poles in the photonic crystal can also be replaced by metal poles); air—2; photonic crystal defect area—3; and base ceramic, sapphire, or other proper material—4.

DETAILED DESCRIPTION OF THE EMBODIMENTS

A. Selecting Si semiconductor poles or metal poles to prepare a photonic crystal microcavity.

As shown in FIG. 1, 1 is a high refractive index medium Si, 2 is low refractive index medium air. The semiconductor Si is produced on a ceramic base 4 using molecular beam epitaxy technology. The photonic crystal is produced on the Si base using etching technology. (If the photonic crystal is to be made of metal poles, a layer of metal is further deposited on the Si base, and then metal poles are produced by ion etching.) The lattice constant of the photonic crystal and the wavelength of the THz light are in the same order of magnitude. Optionally, the lattice constant of the photonic crystal can be selected as 10 µm. The band gap of photonic crystal can be adjusted in THz wavelength range by changing the duty ratio of medium 1. The defect 3, and thus the photonic crystal THz micro-cavity, can be formed by changing the size of one high refractive index medium.

Figure 2:
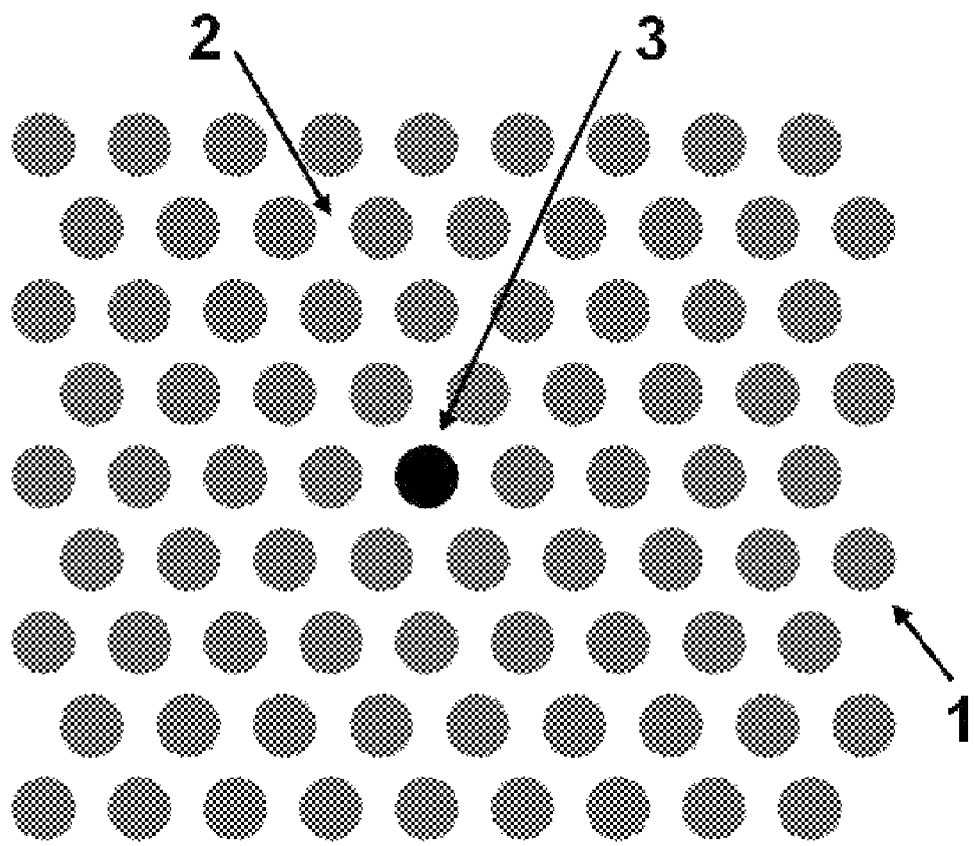
FIG. 2 is a top view of a high sensitivity THz signal detector or a unit of a THz camera system according to one embodiment of this invention.

FIG. 2 illustrates a top view of a photonic crystal microcavity. The defect mode, of which the wavelength is chosen to be equal to that of the THz signal, in the micro-cavity can be tuned to any position in the band gap by changing the radius of the defect area 3. Therefore, the structure parameters of the photonic crystal micro-cavity can be selected according to the THz wavelength. NPN (or PNP) transistor is formed on the Si base by the diffusion method. The transistor is connected with the external circuit. Voltage is applied to the collector electrode and the base electrode, the emitter electrode is connected to a differential amplifier. The purpose of applying bias voltage $E_b$ on the base electrode is to increase the amplification coefficient of the transistor and to have a good linear amplification characteristic. This applied voltage is optional if the requirement is not high. The output signal is connected to the receiver of an external circuit. The differential amplifier can eliminate the current signal produced by the background radiation so that the detector can be used for detecting the THz wave in a room temperature environment.

B. The basic operation principle of the high sensitivity THz signal detector.

Under THz irradiation, a localization of the THz wave is generated in the defect area in the photonic crystal microcavity, and thus the THz wave oscillates inside of the microcavity. The field intensity is high enough to generate heat energy so that electron-hole pairs are produced on the semiconductor Si base. Under the function of bias voltage, the current carrier is injected into the base electrode of the transistor, and is amplified to an observable current at the emitter electrode. Through the differential amplifier, the current is connected to the direct current amplifier of the external current and is amplified thereby again, and is detected finally. Since the current detected is proportional to the intensity of the incident wave, the THz wave signal can be detected. The localization effect of the photonic crystal micro-cavity can provide good detection sensitivity, and the transistor can contribute to amplify the signal so that the detection sensitivity is further improved. Therefore, this device functions as a high sensitivity THz signal detector.

Figure 3:
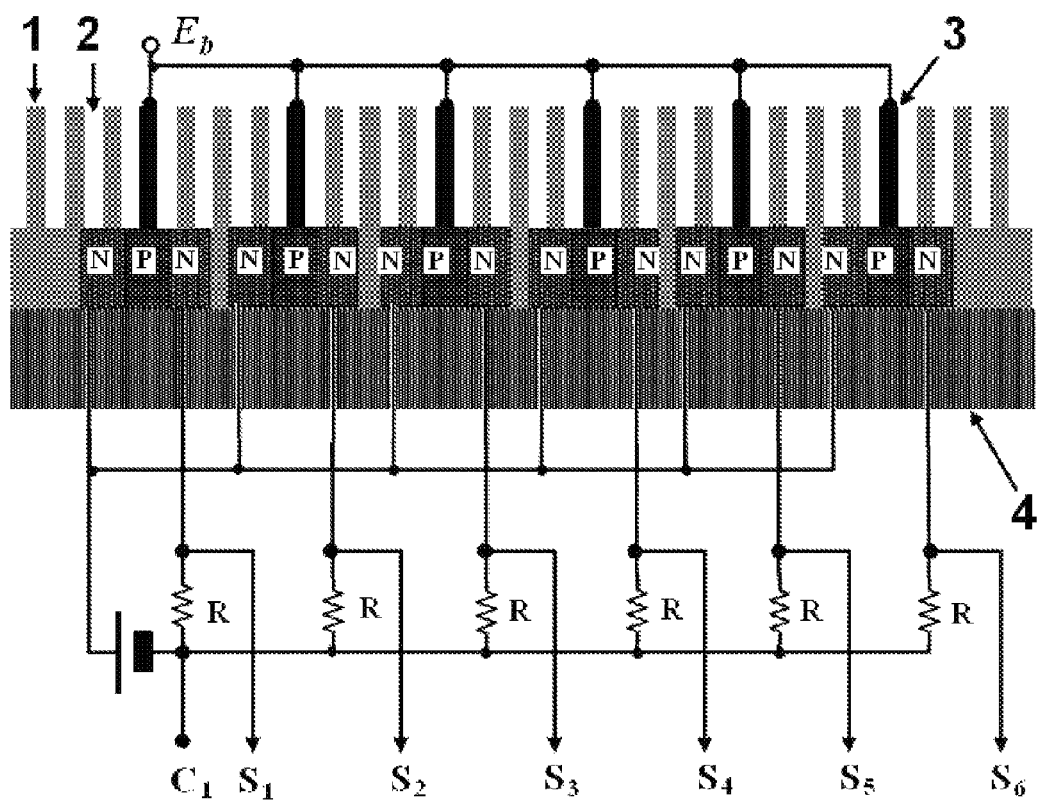
FIG. 3 is a partial view of key parts of a high sensitivity THz wave imaging camera according to one embodiment of this invention.

Applying many such point detectors to construct an array allows for preparing the key part of a THz rapid imaging camera, as shown in FIG. 3. Manufacturing a defect at an area of overlap of three high refractive index dielectric poles in the photonic crystal realizes a two-dimensional integrated THz micro-cavity array, namely, a high sensitivity THz signal detector area array. The distance between each two microcavities is 40 µm (which can be adjusted for special operating wavelength). The number of pixels of the reference CCD is 1024×1024, so that in the design of m×n two-dimensional photonic crystal micro-cavity array, m=1024 and n=1024, the size of the whole m×n two-dimensional photonic crystal is about 4 cm×3.5 cm. Generally, the line and arrow numbers of the two-dimensional photonic crystal micro-cavities should be equal to the corresponding line and arrow numbers of pixels of the CCD.

The base electrodes and collector electrodes of all transistors share the same voltage source. The emitter electrode is connected with a resistor and the differential amplifier, and the output terminal is connected with the external circuit.

In real applications, in order to eliminate the interference of electromagnetic waves from other wave bands, a filter is added on the incident surface of the wave. This filter can prevent all other waves from passing through except a THz wave.

The basic operation principle of high sensitivity THz signal camera is described below. Because each cavity in the photonic crystal THz micro-cavity array is equivalent to a detector and receives a THz wave from a certain position, a THz signal relevant to the THz radiation intensity of the specific position exists inside of each cavity, and the signal is localized in the cavity and is amplified proportionally, which improves the detection sensitivity to THz light greatly. The signal current detected by each detector is outputted from different ports respectively (shown as $S_1$ to $S_6$ in FIG. 3). All the signal currents are connected to a signal acquisition circuit where electronic switches are used; the acquired signal is inputted into an A/D converter, and is then stored in a RAM, and is finally displayed on an electronic screen. In this way, a complete THz image is obtained.

Although this invention has been described in connection with preferred embodiments thereof, it will be appreciated by those skilled in the art that additions, modifications, substitutions and deletions not specifically described may be made without departing from the spirit and scope of the invention as defined in the claims.

What is claimed is:

1. A THz signal detector or camera comprising a photonic crystal, a plurality of THz micro-cavities in said photonic crystal, a plurality of semiconductor units, and a signal acquisition circuit,
   wherein,
      said plurality of semiconductor units are disposed each below one of said THz micro-cavities;
      said plurality of semiconductor units each comprises a transistor or a diode;
      said transistor or said diode is connected to said signal acquisition circuit;
      each of said plurality of THz micro-cavities receives, localizes, and amplifies THz light to generate a high intensity field;
      said high intensity field generates heat, and said heat stimulates electron-hole pairs in said transistor or said diode to form a signal current; and
      said signal current is collected by said signal acquisition circuit.

2. The THz signal detector or camera of claim 1, wherein said photonic crystal and said plurality of THz micro-cavities are made of semiconductor poles or metal poles.

3. The THz signal detector or camera of claim 1, wherein a THz signal is localized in one of said plurality of THz micro-cavities and is amplified proportionally, whereby improving a sensitivity of the THz signal detector or camera to said THz signal.

4. The THz signal detector or camera of claim 1, wherein said signal acquisition circuit comprises electronic switches, and an acquired signal of said signal acquisition circuit is input into an A/D converter.

5. The THz signal detector or camera of claim 4, wherein a signal from said A/D converter is stored in a RAM to obtain a THz image.

6. The THz signal detector or camera of claim 1, wherein said semiconductor units are made of a Si material, a GaAs material, or other semiconductor material.

7. The THz signal detector or camera of claim 1, wherein current carriers of said electron-hole pairs are injected firstly into a base electrode of said transistor or a PN junction of said diode to form said signal current, and then said signal current is connected to said signal acquisition circuit.

8. The THz signal detector or camera of claim 1, wherein
   said photonic crystal comprises a high refractive index medium, a low refractive index medium, and rods made of said high refractive index medium;
   said high refractive index medium is Si or GaAs, or other semiconductor material, or a metal material, and said low refractive index medium is air; and
   each of said plurality of THz micro-cavities is obtained by changing a radius of one of said rods.

9. The THz signal detector or camera of claim 8, wherein a defect mode in each of said plurality of THz micro-cavities is adjusted to a THz frequency by changing a duty ratio between said high refractive index medium and said low refractive index medium.

10. The THz signal detector or camera of claim 8, wherein a defect mode in each of said plurality of THz micro-cavities is adjusted to a THz frequency by changing the lattice constant of said photonic crystal.

11. The THz signal detector or camera of claim 10, wherein said lattice constant and said THz frequency are in the same order of magnitude.

12. The THz signal detector or camera of claim 1, wherein said plurality of THz micro-cavities are two-dimensional photonic crystal micro-cavities having a tetragonal lattice, a trigonal lattice, or a honeycomb structure lattice, or are quasicrystal.

13. The THz signal detector or camera of claim 1, wherein a P section and a N section of said transistor are made by diffusion to form an NPN transistor or a PNP transistor.

14. The THz signal detector or camera of claim 1, wherein a P section and an N section of said diode is made by diffusion.

15. The THz signal detector or camera of claim 1, wherein a background THz noise signal is eliminated by adopting a differential amplifier for said signal current, and by adjusting a bias voltage on said transistor or said diode;
   and said amplifier is connected to said transistor or said diode and said signal acquisition circuit, whereby said signal current is first transferred through said amplifier and then collected by said signal acquisition circuit.

16. A THz signal detector or camera comprising a photonic crystal and a plurality of THz micro-cavities, wherein each of said plurality of THz micro-cavities receives, localizes, and amplifies THz light to generate a high intensity field, and said high intensity field stimulates electron-hole pairs in a transistor or a diode to form a signal current.

17. A THz signal detector or camera comprising a photonic crystal and a plurality of THz micro-cavities, wherein heat generated within THz signal detector or camera by a THz wave raises temperature of a P portion and an N portion of a diode disposed below said THz micro-cavities, a number of current carriers in the diode increases as a result, the current carriers form a drift current, and the drift current is detected by an external current.

* * * * *